United States Patent [19]

Ogasa

[11] 4,252,907
[45] Feb. 24, 1981

[54] PROCESS FOR PREPARING A POROUS COMPOSITE MATERIAL

[75] Inventor: Tatsuo Ogasa, Yokohama, Japan

[73] Assignee: Director General of Agency of Industrial Science and Technology, Tokyo, Japan

[21] Appl. No.: 72,185

[22] Filed: Sep. 4, 1979

[30] Foreign Application Priority Data

Nov. 18, 1978 [JP] Japan .................. 53-142522

[51] Int. Cl.$^3$ .......................... C08J 9/08; C08J 9/10
[52] U.S. Cl. ............................ 521/92; 521/65; 521/72; 521/134; 521/139; 521/140; 521/905
[58] Field of Search ............. 521/72, 65, 92, 134, 521/905, 139, 140

[56] References Cited

U.S. PATENT DOCUMENTS

| | | | |
|---|---|---|---|
| 3,027,336 | 3/1962 | Götz | 521/905 |
| 3,795,720 | 3/1974 | Schwartz | 521/134 |
| 3,816,170 | 6/1974 | Mudde | 521/134 |
| 3,873,476 | 3/1975 | Jabs | 521/905 |
| 3,879,493 | 4/1975 | Mudde | 521/905 |
| 3,888,766 | 6/1975 | De Young | 521/905 |

*Primary Examiner*—Morton Foelak

[57] ABSTRACT

A porous composite material includes a porous body formed of a hydrophobic polymer such as polyvinyl chloride and a layer of a hydrophilic polymer such as polyvinyl alcohol provided over at least a portion of the interior surface of each of the pores of the porous body. The composite material is obtained by a process including the steps of dispersing an aqueous solution containing a hydrophilic polymer and a foaming agent into a solution of a hydrophobic polymer in an organic solvent to form an emulsion, removing the water and the organic solvent from the emulsion to obtain a solid, and subjecting the solid to foaming conditions.

7 Claims, No Drawings

PROCESS FOR PREPARING A POROUS COMPOSITE MATERIAL

BACKGROUND OF THE INVENTION

This invention relates to a porous composite material having a hydrophilic polymer layer provided over the interior surface of each of the pores of a porous hydrophobic polymer body.

It is well known that a foaming treatment of a mixture containing a resin such as polyethylene and a foaming agent may produce a porous material. The heat-insulating and sound-proofing properties of such porous material have led to use of the material as construction materials. However, the conventional porous material has a defect that it is poor in hydrophilic or hygroscopic property.

SUMMARY OF THE INVENTION

In accordance with one aspect of the present invention, there is provided a porous composite material which includes a porous body formed of a hydrophobic polymer and which has a multiplicity of pores each communicating with the surface of the body. Each pore has, over at least a portion of its interior surface, a layer containing a hydrophilic polymer.

In contrast with the conventional one-component porous material such as of polyethylene, the porous composite material of this invention has, as a whole, an improved hydrophilic or hygroscopic property because of the presence of the hydrophilic polymer layers on the interior surfaces of the pores in the composite material.

In another aspect of the present invention, there is provided a process for producing the above-described porous composite material.

It is, therefore, the primary object of the present invention to provide a porous composite material having a hygroscopic property as well as heat-insulating and sound-proofing properties.

Other objects, features and advantages of the present invention will become apparent from the detailed description of the invention to follow.

DETAILED DESCRIPTION OF THE INVENTION

Porous composite material according to the present invention includes a porous body formed of a hydrophobic polymer. Examples of the hydrophobic polymer include polyolefin resins such as polyethylene, polypropylene, polybutene and ethylene-propylene copolymers; styrene resins such as polystyrene and acrylonitrilebutadiene-styrene copolymers; acryl resins such as polyacrylonitrile and polyacrylic acid esters; and vinyl chloride resins such as polyvinyl chloride and polyvinylidene chloride.

The porous body has a multiplicity of generally homogeneously diespersed pores. Each pore is in communication with the surface of the body and some of the pores can be communicated with each other.

At least a portion of the interior surface defining each of the pores of the porous body is covered with a layer containing a hydrophilic polymer. Illustrative of the hydrophilic polymers suitably used in this invention are polyvinyl alcohol, polyacrylic acid and a salt thereof, polyvinyl pyrrolidone, and polyethylene glycol.

The porous composite material thus constructed preferably has a porocity of 10 to 70% and a mean pore size of 1 to 10μ. The ratio by weight of the hydrophilic polymer to the hydrophobic polymer in the composite material is generally 1 to 25:100, preferably 10 to 20:100.

The porous composite material may be produced in the following manner. First, a solution of the hydrophobic polymer in an organic solvent and an aqueous solution containing a hydrophilic polymer and a foaming agent are prepared.

Any organic solvent can be used for the preparation of the hydrophobic polymer solution so far as (1) it can dissolve the hydrophobic polymer and (2) the solution of the hydrophobic polymer in the solvent is not missible with the above-mentioned aqueous solution but can form an emulsion when these solutions are vigorously mixed with each other. Examples of such organic solvent include aromatic hydrocarbons and halogenated derivatives thereof, and aromatic nitro compounds. Since the organic solvent is, as described hereinafter, removed later by evaporation, it is preferred that the organic solvent have a low boiling point. For this reason, the use of ethylene dichloride, benzene and chloroform is most advantageous. The content of the hydrophobic polymer in the organic solution is generally 1 to 30 wt %, preferably 5 to 15 wt %.

As the foaming agent, bicarbonates capable of forming gases upon contact with an acid, such as potassium bicarbonate, sodium bicarbonate may be employed. Substances capable of decomposing to generate gases upon being heated, such as azodicarbamide, diphenyl sulfone-3,3'-disulfohydrazine, benzenesulfonic acid-diphenylhydrazine, may also be used as the foaming agent.

The content of the hydrophilic polymer in the aqueous solution is generally 1 to 20 wt %, preferably 5 to 10 wt % and that of the foaming agent is generally at least 5 wt %, preferably at least 10 wt % but up to its saturated concentration.

The thus prepated organic and aqueous solutions are then mixed together and emulsion in which aqueous liquid particles of the aqueous solution are dispersed in the hydrophobic polymer solution is formed by any suitable ways such as by vigorous stirring. The mixing ratio by weight of the aqueous solution to the organic solution is generally in the range of 2 to 20:100. In this case, the hydrophilic polymer is used in an amount 1 to 25, preferably 10 to 20 parts by weight and the foaming agent is 2 to 70, preferably 30 to 60 parts by weight both per 100 parts by weight of the hydrophobic polymer. It is possible to prepare aqueous solutions of the hydrophilic polymer and the foaming agent separately and to mix these aqueous solutions to the organic solution for the formation of the emulsion.

The emulsion is then subjected to a drying treatment so as to remove the water and the organic solvent from the entire emulsion, while maintaining the emulsified state. Though any known methods may be applicable to the removal of the solvents, it is preferred that the drying of the emulsion be performed at a temperature of −20° to 60° C. under vacuum or a reduced pressure. The solvent-removal treatment is generally conducted until substantially all the water and the organic solvent contained in the emulsion have been removed therefrom.

A solid mass obtained as a result of the solvent-removal treatment is subsequently subjected to a foaming treatment, by which the entire solid is made porous by the action of the foaming agent. A heat treatment, acid treatment or the like treatment is utilized for foaming the solid mass according to the kind of the foaming agent employed. The conditions for and the manner of the foaming treatment are well known in the art.

Thus, a multiplicity of pores are formed within the hydrophobic polymer body. Each pore is in communication with the surface of the body through a path formed by the gases generated and escaped to the air during the treatment of the foaming agent. Further, since these pores are produced with the portions corresponding to the liquid particles containing the hydrophilic polymer and the foaming agent as cores, at least a part of the interior surface of each pore is covered with a layer of the hydrophilic polymer. As a result of this structure, the porous composite material produced in accordance with the process of the present invention has an improved hygroscopic property inherent to the hydrophilic polymer exposed to the surfaces of the pores.

The porous composite material of this invention may be applied to a variety of fields. For example, films or sheets of the composite material can be used as interior decoration materials which also serve to prevent dew from being formed thereon. The porous composite material can be provided over the surface of a substrate to form a composite article. Such article may be advantageously produced by applying a coating of the above-described emulsion onto the substrate, drying the coating and subjecting the dried coating to a foaming treatment.

The following examples will further illustrate the present invention.

EXAMPLE 1

100 parts by volume of a solution of polyvinyl chloride in ethylene dichloride (concentration of the polymer in the solution was 100 g/l), 10 parts by volume of an aqueous solution of polyvinyl alcohol (concentration: 20 g/l) and 15 parts by volume of an aqueous potassium bicarbonate solution (concentration: 250 g/l) were mixed together for emulsification. The emulsion was applied onto a glass plate, which was then placed in a freezer at $-20°$ C. for 48 hours. Thereafter, the emulsion was dried at $60°$ C. under vacuum to obtain a film of 0.5 mm thick. The film, after being separated from the glass plate, was then immersed in 2 N HCl for 48 hours to allow to generate $CO_2$ by decomposition of the potassium bicarbonate. After washing with water, the resulting film was dried under vacuum to obtain a porous composite film having a density of 0.58. The porous composite film had a porosity of 60% and the diameter of the pores was found to range from 5 to $50\mu$. When the composite film was kept at $30°$ C. and under a constant relative humidity of 85% and 91%, the film absorbed moisture in an amount of 21% based on its dry weight in the case of 85% humidity and 25% in the case of 91% humidity.

COMPARATIVE EXAMPLE

For the purpose of comparison, a porous film was prepared in the same manner as in Example 1 except that no polyvinyl alcohol was employed. The film had a porosity of 30%. A moisture absorb test revealed that the film absorbed moisture in an amount of 9% based on its dry weight when the film was allowed to stand under conditions of $30°$ C. and 91% humidity.

EXAMPLE 2

Porous composite films were produced by the same way as in Example 1 except that the weight ratio of $KHCO_3$/PVC was varied. The porosity of the film in the case of $KHCO_3$/PVC ratio of 0.63 was 69% and in the case of $KHCO_3$/PVC ratio of 0.19 was 45%.

EXAMPLE 3

Example 1 was repeated using polyacrylic acid and polyvinyl pyrrolidone, respectively, in place of the polyvinyl alcohol. The amounts of moisture absorbed in the resulting porous composite films, when placed under conditions of $30°$ C., 91% relative humidity, were 21% in the case of polyacrylic acid and 22% in the case of polyvinyl pyrrolidone, based on the dry weight of respective films.

What is claimed is:
1. A process for the production of a porous composite material, comprising the steps of:
    emulsifying an aqueous solution containing a hydrophilic polymer and a foaming agent into a solution of a hydrophobic polymer in an organic solvent to form an emulsion in which liquid particles of said aqueous solution are dispersed in said organic solution;
    removing said organic solvent and water from said emulsion to obtain a solid; and
    subjecting said solid to foaming conditions thereby to obtain the porous composite material.
2. A process as set forth in claim 1, wherein said emulsion forming step includes mixing the aqueous solution containing 1 to 20 wt % of the hydrophilic polymer and at least 5 wt % but up to the saturated concentration of the foaming agent with the organic solution containing 1 to 30 wt % of the hydrophobic polymer with a mixing ratio by weight of the former solution to the latter solution in the range of 2 to 20:100.
3. A process as set forth in claim 1 or 2, wherein the hydrophilic polymer is used in an amount of 1 to 25 parts by weight per 100 parts by weight of the hydrophobic polymer and the foaming agent is used in an amount of 2 to 70 parts by weight per 100 parts by weight of the hydrophobic polymer.
4. A process as set forth in claim 1, wherein the hydrophobic polymer is a resin selected from the group consisting of polyolefin resins, styrene resins, acrylic resins and polyvinyl chloride resins.
5. A process as set forth in claim 4, wherein the hydrophobic polymer is a member selected from the group consisting of polyethylene, polypropylene, polybutene, ethylene-prolylene copolymers, polystyrene, acrylonitrile-butadiene-styrene copolymers, polyacrylonitrile, a polyacrylic acid ester, polyvinyl chloride and polyvinylidene chloride.
6. A process as set forth in claim 1, wherein the hydrophilic polymer is a member selected from the group consisting of polyvinyl alcohol, polyacrylic acid, polyvinyl pyrrolidone, polyethylene glycol and a salt of polyacrylic acid.
7. A process as set forth in claim 1, wherein the foaming agent is a member selected from the group consisting of potassium bicarbonate, sodium bicarbonate, azodicarboamide, diphenylsulfone-3,3'-disulfohydrazine and benzenesulfonic acid diphenylhydrazine.

* * * * *